March 3, 1942.    L. P. WAGUESPACK    2,274,877
INTERNAL COMBUSTION ENGINE
Filed April 30, 1941    2 Sheets-Sheet 1

Inventor

LOUIS P. WAGUESPACK

By *Clarence A. O'Brien*

Attorney

Inventor
LOUIS P. WAGUESPACK.

By *Clarence A. O'Brien*

Attorney

UNITED STATES PATENT OFFICE 2,274,877

INTERNAL COMBUSTION ENGINE

Louis P. Waguespack, China, Tex.

Application April 30, 1941, Serial No. 391,208

1 Claim. (Cl. 123—51)

My invention relates to improvements in internal combustion engines, the principal object in view being to provide a simply constructed marine engine of the double acting, twin crank shaft type for driving, for instance, twin propellers and in which the crank shafts are positively synchronized throughout the cycle of operation, smooth high speed operation is accomplished together with maximum power output.

Other and subordinate objects are also comprehended by my invention, all of which, together with the precise nature of my improvements, will be readily understood when the succeeding description and claim are read with reference to the drawings accompanying and forming part of this specification.

Figure 1:
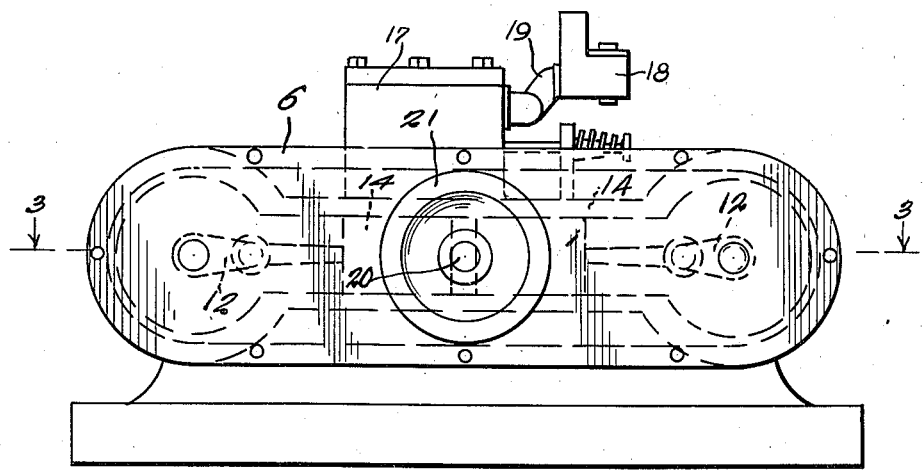
Figure 1 is a view in front elevation of a preferred embodiment of my invention.
Figure 2:
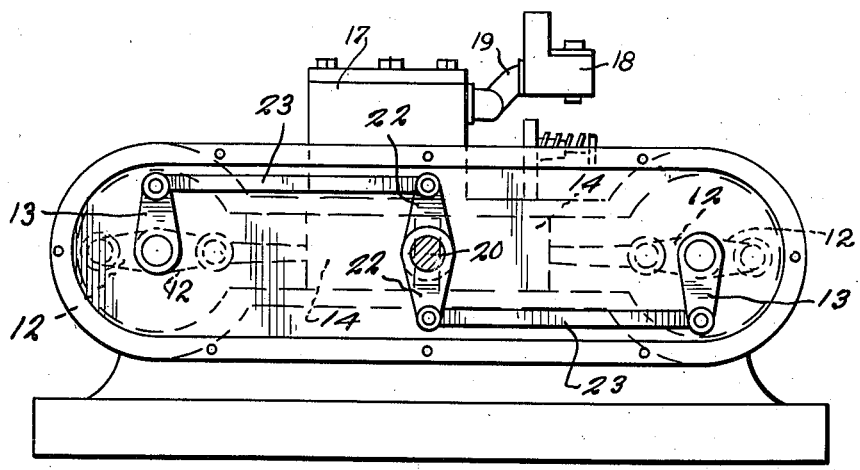
Figure 2 is a similar view with the front plate of the casing removed.

Reference being had to the drawings by numerals, my improved engine comprises a plurality, four being shown, of side by side, horizontal cylinders 1 cast enblock with open ends and water jackets 2 surrounding the same, said cylinders constituting a block in a substantially rectangular casing 3 having a pair of crank chambers 4 at opposite ends of the block, respectively, a front partition 5, a cover plate 6 in front of said partition and a front crank chamber 7.

A pair of crank shafts 8, 9, extend through the crank chambers 4, respectively, diametrically of the cylinders 1, and into the front crank chamber 7, said shafts being suitably journalled in the rear side 10 of casing 3, also in the partition 5 and cover plate 6. Additional bearings, as at 11, may be provided for said shafts in the crank chambers 4. The crank shafts 8, 9 provide a pair of twin cranks 12 adjacent the opposite ends of each cylinder 1 and related thereto, and a pair of similar cranks 13 in the front chamber 7. The cranks 12 are staggered alternately upon opposite sides of the shafts 8, 9, as the case may be.

In each cylinder 1 is a pair of oppositely acting, reciprocating pistons 14. A pair of suitable connecting rods 15 extend between each pair of pistons 14 and the related cranks 12 of the cylinders, respectively.

The cranks 12 of each crank shaft 8, 9 are arranged in 180 degree angular relation. The pistons 14 and cranks 12 are so arranged that the pairs of pistons 14 attain the limits of their power and compression strokes in alternate cylinders 1, respectively, and are spaced apart in the limits of their compression strokes to provide combustion chambers 16 therebetween.

The numeral 17 designates a casting on top of the casing 1 designed to form a suitable valve chamber (not shown), for exhaust and intake valves which may be of any desired type, and the numeral 18 designates the carburetor and 19 the intake manifold leading to said valve chamber, these parts not being illustrated in detail but being merely represented as a unit since they form per se no part of the present invention.

The cranks 13 are arranged oppositely, relatively, and in 90 degree angular relation to the cranks 12.

Journaled in the partition 5 and cover plate 6 midway of the crank shafts 8, 9 and parallel therewith is a transmission and synchronizing shaft 20 having fast thereon exteriorly of the chamber 7 a fly wheel 21 and embodying within the chamber 7 a pair of cranks 22 extending diametrically in opposite directions and in the same angular relation to the cranks 12 as the cranks 13. A pair of connecting rods 23 connect the cranks 13 to the cranks 22, respectively.

Figure 3:
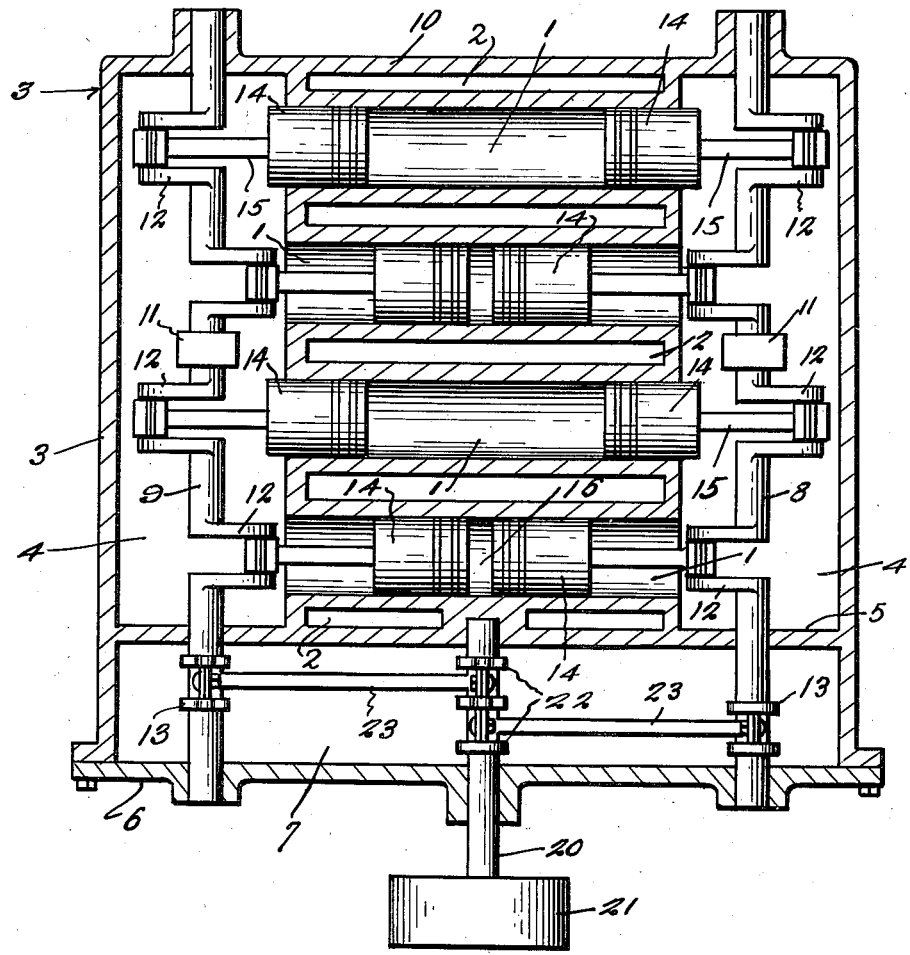
Figure 3 is a view in horizontal section taken on line 3—3 of Figure 1.

In the starting position of the engine, the pistons 14 of alternate pairs are in substantially the limits of their power strokes and compression strokes, respectively, and the cranks 12 are substantially horizontal as best shown in Figure 3, whereas, the cranks 13 of each shaft 8, 9 extend oppositely, relatively, in 90 degree angular relation to the cranks 12 and the pair of cranks 22 extend similarly to cranks 13, that is to say, oppositely, relatively, in 90 degree angular relation to the cranks 12. This relation of cranks obviously is maintained by the rods 12 throughout the cycle of operation of the engine so that the power output of crank shafts 8, 9 cannot be blocked by the transmission shaft 20 and load thereon and said crank shafts 8, 9 are always synchronized by the transmission shaft and the described connections between the said transmission shaft and the crank shafts 8, 9, said connections furthermore properly regulating the timing to obtain smooth operation.

The foregoing will, it is believed, suffice to impart a clear understanding of my invention without further explanation.

Manifestly the invention, as described, is susceptible of modifications without departing from the inventive concept, and right is herein reserved to such modifications as fall within the scope of the subjoined claim.

What I claim is:

In an internal combustion engine, a plurality of cylinders arranged enblock side by side in parallel relation and in a horizontal plane, a pair of crank shafts extending across opposite ends of the cylinders, said shafts providing a pair of twin cranks for each cylinder at opposite ends of the same, the cranks of each shaft being disposed alternately in 180 degree angular relation, the cranks in each pair being oppositely acting, a pair of oppositely acting pistons in each cylinder operatively connected to the twin cranks for the cylinder, a pair of end cranks on said crank shafts, respectively, arranged oppositely and in 90 degree angular relation to the cranks of said crank shaft and being of the same length as the cranks of said crank shafts, and synchronizing means connecting said end pair of cranks, comprising a shaft journaled intermediate the cranks of said end pair, a pair of cranks on said shaft extending diametrically oppositely therefrom and of the same length as the cranks of said end pair, the cranks on the last mentioned shaft being arranged also in 90 degree angular relation to the cranks of said crank shafts, and a pair of links connecting the pair of end cranks to the pair of cranks on said shaft last mentioned.

LOUIS P. WAGUESPACK.